Jan. 2, 1962            R. A. ARMER            3,015,208

PARKING METER AND TIME RELEASE MECHANISM THEREFOR

Filed Dec. 8, 1958            4 Sheets-Sheet 1

INVENTOR.
Rollin A. Armer
BY
Attorney

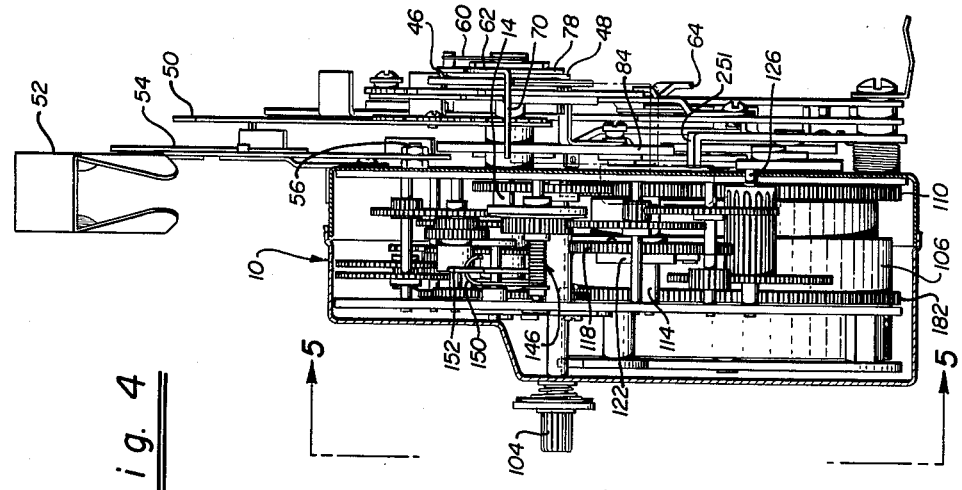
Fig. 4
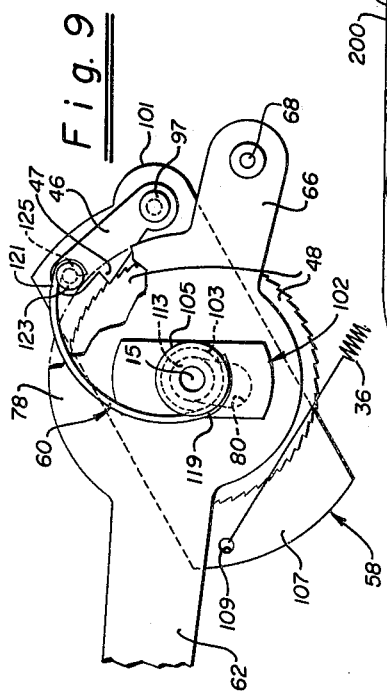
Fig. 9
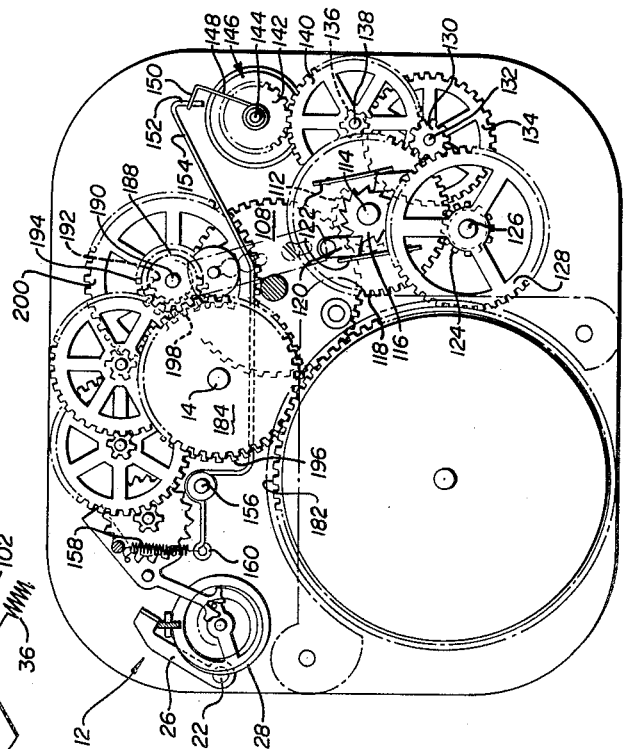
Fig. 5
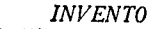
INVENTOR.
Rollin A. Armer
*His* Attorney Jan. 2, 1962 R. A. ARMER 3,015,208
PARKING METER AND TIME RELEASE MECHANISM THEREFOR
Filed Dec. 8, 1958 4 Sheets-Sheet 4
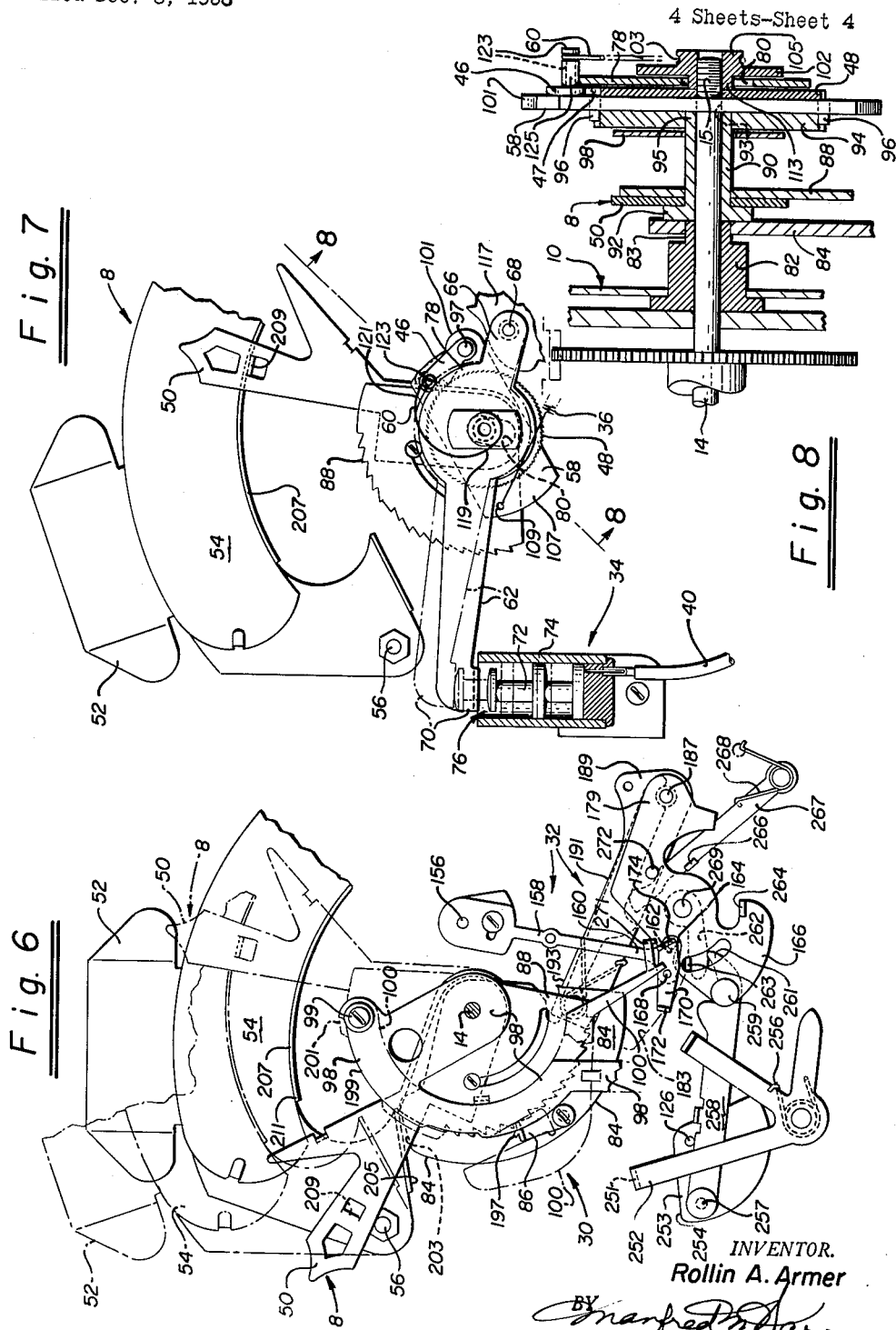
INVENTOR.
Rollin A. Armer
BY
His Attorney United States Patent Office 3,015,208
Patented Jan. 2, 1962

3,015,208
PARKING METER AND TIME RELEASE
MECHANISM THEREFOR
Rollin A. Armer, Berkeley, Calif., assignor, by mesne assignments, to Calpat Products, Inc., a corporation of Nevada
Filed Dec. 8, 1958, Ser. No. 778,907
6 Claims. (Cl. 58—142)

The invention relates to coin operated parking meters for limiting the parking time of an automotive vehicle to the time indicated on the meter, and has special reference to devices for returning the meter to its "zero" position to wipe out any remaining time indicated on the meter as the vehicle leaves the parking space for which the meter is provided, such as the devices disclosed in companion applications, Serial Nos. 769,889 and 773,503.

An object of the present invention is to provide a time release structure of the character described which is particularly adapted for use with the style of parking meter known as the "Dual Meter" manufactured by Rockwell Manufacturing Co., of Pittsburgh, Pennsylvania, and which time release structure is simple in construction, foolproof in operation, rugged in use, dependable in service, and utilizes a low cost mechanism.

Another object of this invention is to provide with a minimum number of simply formed and easily applied parts, a convenient and ready conversion of the "Dual Meter" to operate as a meter of the time cancellation type.

It is a further object of this invention to provide a time release structure which is designed to fail in operating position of the meter whereby if the vehicle leaving the parking area does not actuate the time release, for any reason, the meter will continue to function in normal manner.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings (4 sheets):

FIGURE 4 is an end elevational view of the meter mechanism removed from the case and viewed from the left with reference to FIGURE 3.

FIGURE 5 is a rear elevational view looking to the right in FIGURE 4 as indicated by the arrows on line 5—5, certain parts being deleted for clarity of illustration.

FIGURE 6 is a schematic front elevational view of the coin controlled mechanism and the time pointer and violation flag assembly in the time expired position.

FIGURE 7 is schematic elevational view showing the pneumatic actuator in section and its operative connection with the terminal shaft and the pointer hand and violation flag assembly in the position indicating time on the meter.

FIGURE 8 is a fragmentary enlarged cross section taken centrally longitudinally of the terminal shaft structure, taken substantially along the plane of line 8—8 of FIGURE 7.

FIGURE 9 is a fragmentary front elevation on an enlarged scale of portions of the mechanism shown in FIGURE 7.

Figure 1:
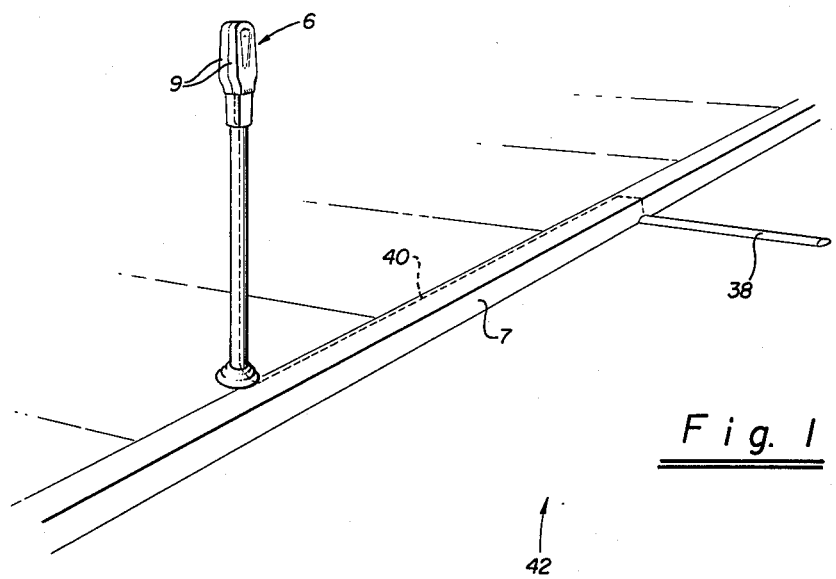
FIGURE 1 is a fragmentary perspective view of a street and curbing therefor in which a parking meter embodying this invention has been installed.
Figure 2:
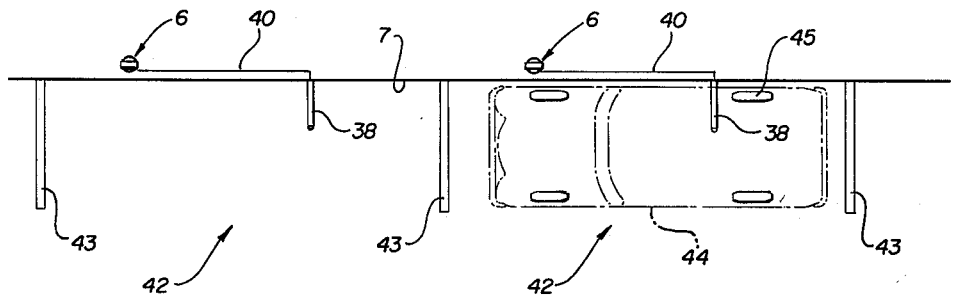
FIGURE 2 is a fragmentary plan view of the parking spaces provided along the street shown in FIGURE 1 and showing parking meters made according to this invention installed for controlling the spaces and an automobile in phantom lines occupying a space.

With continued reference to the drawing, the parking meter 6, and time release structure therefor, is installed adjacent street curb 7, and comprises a time pointer and violation flag assembly 8 movable between a first position indicating time on meter 6 (FIG. 7) and a second time expired position on the meter (solid line position in FIG. 6) and disposed within a two piece meter housing 9; a clock mechanism, also contained in the meter housing and enclosed within a two piece case 10, includes a drive train and an escapement 12 and a terminal or final drive shaft 14 slowly rotated during operation of the clock mechanism; a stop means 16 in the form of a lever 18 having an intermediate lateral neck or shaft 22 pivoted in the case 10 with one arm 24 disposed on the outside of the case in the path of movement of assembly 8 to be rocked about its pivot by the assembly in its second position causing its other arm 26 arranged within case 10 to move into motion arresting engagement with balance wheel 28 of the escapement to arrest operation of the clock mechanism; selectively releasable engaging means 30 operatively connecting assembly 8 to shaft 14 to effect connected movement of the assembly with the shaft in engaged position and permitting free rotation of the assembly relative to the shaft in disengaged position; coin controlled means 32, upon being actuated by the deposit of a coin moving assembly 8 to its first position and releasing stop means 16; assembly 8 when in its second position affects the setting of stop means 16; pneumatic means, defined by an air cylinder 34, connected to actuate engaging means 30 to disengaged position; means, in the form of a spring 36, returning assembly 8 to its second position when released in the disengaged position of engaging means 30; and a collapsible air tube 38 connected through a conduit 40 to pneumatic means 34 and mounted in a parking space 42 delineated by lines 43 occupied by an automotive vehicle 44 in position for traversing by a curb wheel 45 of the vehicle upon leaving the parking space to provide an air pulse for energizing pneumatic means 34.

The selectable releasable engaging means includes a unidirectional latching pawl 46 and ratchet 48 constructed to permit movement of assembly 8 relative to shaft 14 in the direction of movement of the assembly by coin controlled means 32 to its first position and being so constructed as to automatically latch assembly 8 in a reverse direction of movement to effect timed displacement of the assembly towards its second position, and pneumatic means 34 being connected to move pawl 46 out of engagement with ratchet 48 to thereby release assembly 8 for its free movement, relative to shaft 14, from its first to its second positions.

Figure 3:
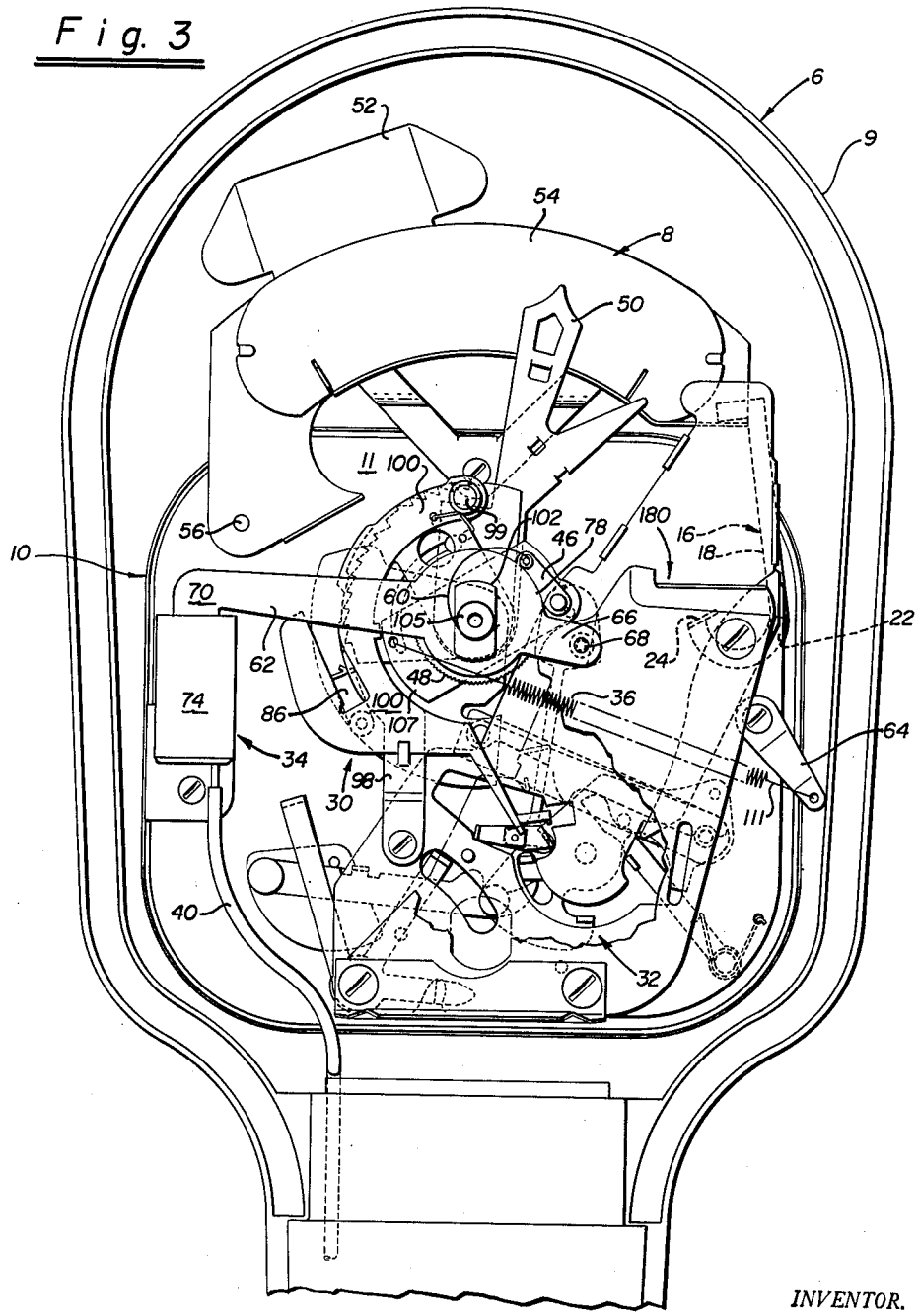
FIGURE 3 is a front elevational view of the meter mechanism taken on an enlarged scale and with the front half of the outer case removed to show the interior construction.

Assembly 8 includes a time pointer 50 journalled for rotation concentrically of shaft 14 for movement between the first time indicating position of the assembly and the second time expired position of the assembly (as indicated by the broken and solid line positions, respectively, of the pointer as shown in FIG. 6), and a violation flag 52, upstandingly carried by a curved time indexing scale 54 pivoted at one end on the clock mechanism case 10, as at 56, movable from between operable (FIG. 6) and inoperable (FIG. 7) positions and operatively connected to pointer 50 for movement to operable position by movement of the pointer to its second position and effective to set stop means 16 in the operable position. The coin controlled mechanism or means 32 will, upon actuation, move the pointer 50 to its first position to move flag 52 to inoperable position and release stop means 16. Engaging means 30 includes a ratchet wheel 48 carried by shaft 14 adjacent threaded end 15 thereof for rotation therewith and a pawl 46 mounted for rotation with pointer 50 and movable into and out of engagement with ratchet wheel 48. The pawl and ratchet wheel is constructed to effect unidirectional latching action permitting relative movement of the pawl about the wheel in the direction of movement of pointer 50 to its first time indicating position, the pawl automatically latching with ratchet wheel 48, under the influence of a wire pawl spring 60, in a reverse direction of movement, to effect timed displacement of pointer 50 by shaft 14 towards the second time expired position of the pointer. Pneumatic means 34 is connected through an actuating lever 62 to move pawl 46 out of engagement with ratchet wheel 48. Spring 36, connected as shown in FIG. 3, defines the means for returning the pointer to its second position when released by the disengagement of the pawl by energizing the pneumatic means.

To insure disengagement of pawl 46 in any position of travel in its circular orbit about ratchet wheel 48 by lever 62, the lever is provided with an enlarged intermediate portion 78 disposed adjacent to and generally conforming in outline to the circular orbit of travel of the pawl and is so mounted as to traverse the orbit and engage the pawl in all positions of the pawl in its orbital travel. One end 66 of the lever 62 is pivotally mounted at 68 on the front cover 11 of the case 10 adjacent shaft 14. The other end 70 of the lever is disposed to gravitationally rest over an air piston 72 disposed with housing 74 of the air cylinder 34 assembly, defining pneumatic means, and is positioned so as to be engaged and moved from the solid to the broken line positions shown in FIGURE 7, by piston 72 as it is moved longitudinally of housing 74 through the open end 76 thereof, in response to an air pulse transmitted through conduit 40 entering housing 74 behind the piston to cause lever 62 to rock about its pivot and move in an arcuate path normal to and intersecting the axis of shaft 14. Enlarged pawl actuating portion 78 on lever 62 is provided with a closed, elongated slot 80 through which shaft 14 passes permitting movement of portion 78 as lever 62 is moved in its arcuate path. Preferably a roller 125 is provided on pawl 26 for rolling engagement with the upper edge of lever portion 78, the roller 125 here being journalled on a pin 123 (see FIGURES 8 and 9).

As best illustrated in FIGURE 8, shaft 14 extends through a bearing bushing 82 secured in the front cover of the clock mechanism case 10 with its threaded end 15 disposed outwardly of the cover. Rotatably mounted on a reduced portion 83 of bushing 82 is a quadrant plate 84 carrying a pawl 86 engageable with a toothed ratchet segment 88 secured to pointer 50. Segment 88 along with pointer 50 is press fitted in side-by-side relation on a sleeve 90 having an upstanding peripheral flange 92 at one end and mounted longitudinally along shaft 14 for concentric rotation thereabout. Quadrant plate 84 abuts the outer face of flanged end 92 of sleeve 90. A wheel or gear 94 is press fitted onto sleeve 90 at its forward end 95. A bar 98 is mounted on sleeve 90 adjacent wheel 94 to provide a pivotal anchor 99 (see FIGURE 6) for one end of a member 100 of the coin operated mechanism.

To modify the dual meter as hereinabove described to provide the time cancellation function in accordance with the present invention, the conventional "dual meter" parts outboard of gear wheel 94 are removed and replaced with the several parts of the present invention as follows: cam mounting plate 58, ratchet wheel 48, lever 62, jam nut 102, spring 60, spring 36, and its mounting arm 64, and pneumatic means 34. Plate 58 is of elongated form having a dimension sufficient to carry pawl 46 radially in juxtaposition to ratchet wheel 48 and is provided with a plurality of circumferentially spaced pins 96 which span the diameter of gear 94 and engage in the teeth thereof to provide concentric mounting of the plate on the gear and for rotation therewith. Plate 58 is provided with an enlarged center opening 93 which is loosely mounted over shaft end 15 for relative rotation therebetween. Pawl 46 is pivotally secured as by pin 97 to one end 101 of the mounting plate 58 in the plane of ratchet wheel 48 and has a tooth 47 intermediate its ends which is normally urged into engagement with the ratchet teeth on the periphery of wheel 48 by spring 60. The opposite end 107 of the mounting plate projects radially from the shaft 14, as seen in FIGURES 3 and 7, and serves as an anchor point 109 for one end of spring 36, it being noted in this connection that the plate 58 being secured to sleeve 90 through gear wheel 94 will cause the rotation of pointer 50 in a counterclockwise direction as seen in FIGURES 3 and 7 to its starting or zero position. The opposite end 111 of spring 36 is here secured to a mounting arm 64 which is affixed to the case 10 for this purpose.

Ratchet wheel 48 is of course required to rotate with shaft 14 relative to the bushing assembly and the fastening of the ratchet wheel to the shaft is conveniently accomplished in the present structure by threading ratchet wheel 48 on to shaft end 15 and securing it in place by jam nut 102. As will be seen, however, from FIGURE 8, jam nut 102 is provided with an internally projecting hub 113 which serves as a spacer between the jam nut and the ratchet wheel and for free sliding engagement therebetween of lever 62. The latter is pivotally fastened at one end 66 by pin 68 to a stationary part 117 of the coin chute 80 and extends therefrom generally radially of shaft 14 to its opposite end 70 which is positioned opposite the open end 76 of the pneumatic cylinder 74 for engagement and displacement by the internal piston 72. At shaft 14, lever 62 is formed with an elongated slot 80 surrounding the shaft and permitting limited reciprocating motion of lever 62 relative to the shaft.

In the foregoing assembly parts care is exercised to retain the threaded ratchet wheel 48 in non-binding condition against pawl mounting plate 58 so as to permit free relative movement of the parts as above described. Conveniently jam nut 102 is formed with an exterior circular hub 105 containing a peripheral groove 103 for rotatably securing a curved end 119 of spring 60, the latter spring being here formed of a simple open wire loop or hook having its opposite end 121 secured to a spring mounting pin 123 on pawl 46.

Thus, with pawl 46 in engaged position with respect to ratchet wheel 48 and with the clock mechanism operating, the timed rotation imparted by escapement 12 to the terminal shaft 14 will be transmitted through mounting plate 58 and wheel 94 connected thereto to the sleeve 90 which in turn will rotate concentrically of shaft 14 to effect timed displacement of pointer 50 toward its second time expired position. However, upon movement of pawl 46 to its disengaged position by energizing pneumatic means 34, sleeve 90 will be rapidly rotated concentrically of terminal shaft 14 by plate 58 acting under the influence of spring 36 to immediately return the pointer to its second time expired position and cause movement of the flag to its operable position and stop means 16 to be set to halt operation of the clock mechanism.

Meter 6 is of the so-called automatic type, that is, one having a main power spring wound periodically by the attendant and which serves to power the various operations of the meter on insertion of a coin. Winding of the main spring motor 106 is here effected by turning the splined end of winding stem 104 which is connected to the clock motor through gears 108 and 110. Gear 108 also meshes with gear 112 fixed on shaft 114 to impart rotation to shaft 114. A ratchet wheel 116 is fixed on shaft 114 while a gear 118 is mounted to float on the shaft and carries circumferentially spaced pawls 120 on one face thereof cooperating with ratchet wheel 116. Springs 122 urge pawls 120 into engagement with ratchet wheel 116 to allow only unidirectional rotation of the winding stem to wind the main spring motor 106.

Energy to lift the time indicator hand 50 and the flag 52 is derived from the main spring motor 106 under coin control and driven through the mechanism as illustrated in FIGURES 4, 5, and 6. A coin dropped into the top of coin chute 180 will fall on to 3 tabs—263, 264, 266 and engaging at the same time one end 162 of a lever 170 pivoted at 168, see FIGURE 6. Also connected at 168 to lever 170 is the lower end 160 of lever 158. Displacement of the lower end 160 of lever 158 by the inserted coin in a clockwise direction as seen in FIGURE 6, causes rotation of shaft 156 in a counter clockwise direction as viewed in FIGURE 5. Fastened on shaft 156 is a lever 154 having a hook end 152 which on counterclockwise displacement disengages loop 150 on arm 148 of spring clutch 146 on shaft 144 thus releasing the main spring motor 106 through the gear train as seen in FIGURE 5 and including gears 142, 140, shaft 138, gear 134, shaft 132, gear 130, gear 128, shaft 126, gear 124, floating gear 118, and back of spring motor 106 as above described.

Actuation of the time indicator hand 50 and flag 52 is derived from rotation of shaft 126. This structure includes a cam plate 253 (see FIGURE 6) fixed on shaft 126 to rotate in a clockwise direction therewith and which carried one end of link 258 pinned to the cam plate 253 at 257. On rotation of cam plate 253 and 254 of the plate engages one end 251 of a 3-pronged lever 252 to displace this lever against the resistance of a biasing spring 256 to catch and hold the coin as it is released from offset tabs 263, 264, 266 and lever end 162. At the same time link 258 operating through pin 259 rotates bell crank 166 in a counterclockwise direction around shaft 269. Link 191 is connected at one end 189 by pin 187 to portion 179 of bell crank 166 and is connected at its opposite end 193 to quadrant plate 84 which is journalled on the reduced end 83 of bushing 82 as above described rotating quadrant plate 84 in a clockwise direction as viewed in FIGURE 6.

As quadrant plate 84 moves in a clockwise direction a pawl 86 mounted thereon will engage and drive segment 88 in the same direction moving pointer 50 to its indicated time position (shown in broken lines in FIGURE 6 and in solid lines in FIGURES 3–7) and imparting rotation to sleeve 90.

At the same time rotation of bell crank 166 causes pin 272 thereon to move in a counterclockwise direction to engage extension 271 on segment 100 to engage the latter as an outer cam surface 199 which engages an up-ended ear 197 on pawl 86 disengaging the pawl from ratchet 88. The outer surface 199 has at the pivotal anchor 99 a laterally extending cam surface 191 upon which ear 197 rides if not sooner disengaged from the ratchet 88 thus permitting continued rotation of segment 253, link 258, bell crank 166, and link 191 to move through one complete rotational cycle and return the parts to their original position, and wherein end 160 of arm 158 is moved in an opposite direction to rotate shaft 156 in a clockwise direction (see FIGURE 5) and cause lever crank 154 to rock so that hook 152 will again engage loop 150 and stop the action of the clock mechanism drive train.

It will be noted that quadrant plate 84 is provided with laterally extending cam portion 203 which engages an outwardly turned lip 205 formed on the lower edge of the index plate 54 adjacent its pivot 56 whereby the index plate and flag 52 carried thereby will be moved upwardly about pivot 56 to inoperative position as the quadrant plate is moved by actuation of the coin controlled means. An elongated curved lower lip 207 on the index scale 54 will ride along and be supported in elevated position by a tab 209 struck up from pointer 50 when the pointer is raised by cam portion 203 (as shown in dotted lines in FIGURE 6 and in full lines in FIGURE 7). Upon return movement of pointer 50, tab 209 will ride out from end 211 of lip 207 to permit flange 54 to drop gravitationally about its pivot 56 to assume its operative position.

To effect operation of the escapement under the influence of the spring motor 106, spring motor gear 182 engages and drives gear 184 rotatably mounted on terminal shaft 14. Gear 184 meshes with and drives gear 188 fixed on shaft 190. Gears 192 and 194 are fixed in spaced relation on shaft 190 which is mounted to be shifted longitudinally along its axis to selectively bring either gear 192 into mesh with gear 196 fixed on shaft 14 or gear 194 into mesh with gear 198 also fixed on shaft 14 to effect different gear ratios and thereby determine different time intervals to be run down by operation of the meter. Gear 200 fixed on shaft 190 drives escapement 12 through a well-known gearing arrangement.

In the event of failure of the pneumatic tube, or should weather conditions such as snow or ice, or street debris render the tube ineffective to produce the air pulse required to actuate the time release structure, the escapement will continue to function in normal manner so that the meter will allow the full amount of time on the meter to elapse before violation flag 52 will be moved to its operable position. Of course, under those conditions the departure of a vehicle from the parking area will not actuate the time release structure incorporated into the meter, but the meter will continue to operate as if the time release structure were not present until the condition preventing actuation of the time release structure is alleviated. Thus, while no additional revenue will be gained during the inoperative periods of the time release structure, the revenue realized from the normal operation of the meter will continue to accrue.

I claim:

1. A parking meter and time release mechanism therefor comprising, a frame, a clock mechanism mounted thereon and including a drive train and escapement and a terminal shaft slowly rotated in timed movement during operation of said clock mechanism, stop means for said mechanism, a time pointer journalled for rotation concentrically of said shaft for movement between a first position indicating time on the meter and a second time expired position, a violation flag movable between operable and inoperable positions and connected to said pointer for movement to operable position in the second position of said pointer, said flag setting said stop means in the operable position of said flag, coin controlled means moving said pointer to first position and said flag to inoperative position and releasing said stop means, a ratchet wheel carried by said shaft, a pawl mounted for rotation with said pointer and moveable into and out of engagement with said wheel, said pawl and ratchet wheel being constructed for unidirectional latching action permitting relative movement of said pawl and said wheel in the direction of movement of said pointer to its first position and automatically latching in a reverse direction of movement to effect timed displacement of said pointer by said shaft towards second position of said pointer, pneumatic means mounted on said frame and connected to move said pawl out of engagement with said ratchet wheel, spring means returning said pointer to second position when released in the disengaged position of said pawl, and a lever providing the connection between said pneumatic means and said pawl and having a circular actuating portion positioned adjacent to and generally conforming in outline to the circular orbit of travel of said pawl and being mounted for movement causing said portion to traverse said orbit to engage said pawl at all positions thereof in said orbit for moving said pawl out of engagement with said ratchet wheel upon energizing said pneumatic means.

2. A parking meter and time release mechanism as characterized in claim 1 and having a sleeve journalled for rotation on said shaft in spaced relation to an end of said shaft, said time pointer being carried by said sleeve for rotation therewith, said ratchet wheel being secured to said shaft end for rotation with said sleeve, a mounting plate for said pawl secured to said sleeve for rotation therewith adjacent said ratchet wheel, said pawl being pivotally mounted on said plate for movement into and out of latching engagement with said wheel.

3. A parking meter and time release mechanism as characterized in claim 2 wherein said ratchet wheel is threaded on said shaft end, and jam nut threaded on said shaft end against said wheel.

4. A parking meter and time release mechanism therefor as characterized in claim 3 and wherein said jam nut is formed with a circular hub portion, and a spring carried for rotation at one end by said hub portion and connected to said pawl for urging said pawl into engagement with said wheel.

5. A parking meter and time release mechanism therefor comprising, a frame, a clock mechanism mounted thereon and including a drive train and an escapement and a terminal shaft slowly rotated in timed movement during operation of said clock mechanism, stop means for said mechanism, a sleeve mounted longitudinally of said shaft for rotation concentrically thereof, a time pointer carried on said sleeve for rotation therewith between a first position indicating time on said meter and a second time expired position, a violation flag movable between operable and inoperable positions and connected to said pointer for movement to operable position in the second position of said pointer, said flag setting said stop means in the operable position of the flag, coin controlled means moving said pointer to first position causing rotation of said sleeve in one direction and moving said flag to inoperable position and releasing said stop means, a ratchet wheel carried on said shaft for rotation therewith, a pawl mounting plate rotatably mounted on said shaft adjacent said wheel and connected to said sleeve to rotate therewith, a pawl carried by said plate for rotation therewith and movable into and out of engagement with said wheel, said pawl and ratchet wheel being constructed for unidirectional latching action permitting relative movement of said pawl about said wheel in said one direction of rotation of said sleeve and automatically latching in a reverse direction to effect timed displacement of said sleeve in an opposite direction for moving said pointer toward its second position, pneumatic means mounted on said frame and connected to move said pawl out of engagement with said wheel, and spring means connected to said plate to cause rotation of said sleeve in the reverse direction when released in the disengaged position of said pawl to immediately return said pointer to its second position and set flag to operable position.

6. A parking meter and time release mechanism therefor comprising, a frame, a drive shaft, a time indicating pointer journalled for rotation concentrically of said shaft for movement between a first position indicating time on the meter and a second time expired position, spring means biasing said pointer to second position, coin controlled means moving said pointer to first position, a ratchet wheel mounted on and for rotation with said shaft, a pawl mounted for joint rotation with said pointer and in a circular orbit about said shaft and releasably engaged with said wheel, a lever pivotally mounted to said frame eccentrically of said shaft and having an actuating portion formed to engage and displace said pawl and being positioned adjacent to and generally conforming in outline to the circular orbit of travel of said pawl, and pneumatic means mounted on said frame and connected to move said lever when energized across said orbit for moving said pawl out of engagement with said ratchet wheel for releasing said pointer for movement to said second position.

References Cited in the file of this patent

UNITED STATES PATENTS

| | | |
|---|---|---|
| Re. 23,338 | Burton | Feb. 13, 1951 |
| 2,096,155 | Breeden | Oct. 19, 1937 |
| 2,168,302 | McGay et al. | Aug. 1, 1939 |
| 2,262,783 | Toce et al. | Nov. 18, 1941 |
| 2,631,710 | Hale | Mar. 17, 1953 |
| 2,696,899 | Trier et al. | Dec. 14, 1954 |